Oct. 15, 1940.   E. ORSHANSKY, JR   2,218,405
TRANSMISSION
Filed Oct. 21, 1937   11 Sheets-Sheet 4

INVENTOR
Elias Orshansky, Jr.
BY
Duell, Kane & Smoot
ATTORNEY

Oct. 15, 1940.  E. ORSHANSKY, JR  2,218,405
TRANSMISSION
Filed Oct. 21, 1937   11 Sheets-Sheet 10

INVENTOR
Elias Orshansky, Jr.
BY
Duell, Kane + Smoot
ATTORNEYS

Oct. 15, 1940.        E. ORSHANSKY, JR        2,218,405
TRANSMISSION
Filed Oct. 21, 1937        11 Sheets-Sheet 11

Fig. 15

INVENTOR
Elias Orshansky, Jr.
BY
Duell, Kane & Smoot
ATTORNEYS

Patented Oct. 15, 1940

2,218,405

UNITED STATES PATENT OFFICE 2,218,405

TRANSMISSION

Elias Orshansky, Jr., New Haven, Conn., assignor to The Acrotorque Company, New Haven, Conn., a corporation of Connecticut Application October 21, 1937, Serial No. 170,206

5 Claims. (Cl. 74—189.5)

This invention relates to a structurally and functionally improved hydro-mechanical transmission.

It is an object of the invention to furnish an improved apparatus which may be employed to advantage in connection with the transmission of power from a driving to a driven unit. As such, while its uses are manifold, it will be of especial value when employed in association with vehicles of either the rail or dirigible type and including, of course, tractors, marine installations, etc. However, it is not to be regarded as so limited and may obviously be employed in numerous other associations.

A further object of the invention is that of furnishing a transmission ideally intended for coupling with a motor of the internal combustion type a driven member, carrying widely varying loads and overloads and by means of which an operator may, with minimum effort and attention, control the drive from such motor to a driven shaft; such transmission serving to provide for an effective drive in accordance with the torque conditions as currently existing.

In other words, by means of the present invention there is furnished a transmission which may readily be controlled to effect driving of a driven shaft, or other unit coupled thereto. Such shaft or unit may, of course, be of any desired character according to the peculiarities of the installation involved. Thus, with a constant operation of the driving unit or motor, the transmission may serve to initiate operation of the driven shaft or unit and will, under the control of the operator, increase or decrease the speed of operation thereof, in inverse proportion to the resistance-torque encountered. This variation in speed will of course, be limited either by the construction of the transmission and/or by the variable torque-resistance encountered. Also, if a given maximum condition of load should occur and thereupon the torque on the driven shaft or unit should increase, the transmission may readily be adjusted to what might properly be termed a lower ratio of drive.

Another object is that of constructing a unit of this character and by means of which, if desired, a rearward or reverse operation of the driven shaft may be effected despite continued operation of the driving shaft or motor in a given, or initial direction.

Still another object is that of furnishing a transmission embodying relatively few parts, each individually simple and rugged in construction and operating over long periods of time with freedom from all difficulties.

With these and other objects in mind, reference is had to the attached sheets of drawings, illustrating practical embodiments of the invention, and in which.

In these views there has been illustrated a transmission which is primarily intended to be employed in connection with dirigible road vehicles such as trucks and busses. It is to be understood that when placed in these and other associations, it might, in certain instances, be wise to modify or re-design certain portions of the transmission. However, and as will hereinafter appear, the general teachings of the present transmission as illustrated and described in this specification will, under all conditions, be generally followed.

Thus, there is provided by the present invention an improved transmission and involving broadly a mechanical arrangement of parts constituting a drive and a pump and hydraulic motor fluidly connected to each other and also connected to the mechanical drive in such manner that what might be termed the hydraulic and mechanical sides of the transmission are mutually harmonized and related to modify their operations in accordance with varying conditions of resistance as encountered by the driven shaft or member of the transmission. Moreover, by the present invention there is included a structure such that the transmission, in operating over its entire range (for example, from 0 R. P. M. on the part of the driven shaft or unit, to a substantially direct drive ratio of the driven shaft with respect to the driving shaft) will function throughout a series of drive sub-ranges or steps.

In other words, and assuming that the driving shaft is operating substantially constantly at 1000 R. P. M., the hydraulic and mechanical components of the transmission will cooperate initially to overcome the torque resistance of the driven shaft and to turn the same, for example, from 0 to 333 R. P. M. Thereupon the main operating parts will be caused to re-assume their initial conditions, but a heretofore inoperative factor in the transmission will begin to function so that despite the reestablishment of the parts to a substantially initial condition, they will be turning the driven shaft at a speed of from 333 R. P. M. to 666 R. P. M. Thereupon, in the example given, the hydraulic drive and part of the mechanical drive of the transmission will again be caused to reestablish substantially their initial conditions, but one factor will again be altered so that the driven shaft will now (according to varying conditions of torque thereon) function at from 666 R. P. M. to 1000 R. P. M. Conversely, if the resistance to driving on the part of the driven shaft should increase, the operation heretofore described will be reversed, and if the resistance increases to a sufficient extent, the driven shaft may, for example, function at 125 R. P. M. with the initial factor governing the functions of the same and while the driving shaft continues to operate at 1000 R. P. M.

The foregoing is merely by way of example, and, as will hereinafter appear, the factors governing the various ranges of the transmission are, in the illustrated embodiment, primarily mechanical. It is to be understood, however, that these factors might embody numerous different constructions, and need not necessarily be purely mechanical. Additionally, instead of the three ranges of drive present in the herein described transmission, any proper number of ranges might be included.

Thus, in summarized form, one may consider the present transmission as including component parts providing for a mechanical-hydraulic drive, one caused to modify the operation of the other in accordance with the resistance offered to turning of the driven shaft; the transmission moreover including factors which cause the hydraulic and mechanical driving units of the transmission to operate in a series of successive steps, furnishing in aggregate an operating range entirely suitable and adequate for varying driving conditions encountered and without it being necessary to provide an unwieldly or unduly complicated transmission.

It is also contemplated that the hydraulic unit or units of the transmission will, according to the teachings of the present invention, be incapable of assuming more than a predetermined amount of power, irrespective of the reduction ratio. Accordingly, the maximum amount of power handled hydraulically may vary, for example, from 1% of the total power to 50%. In short, the transmission may transmit a large percentage (even substantially 100%) of the power mechanically, but will, at the same time, have variable torque out-put and the infinite variation in ratio ordinarily associated with a purely hydraulic transmission.

Figure 1:
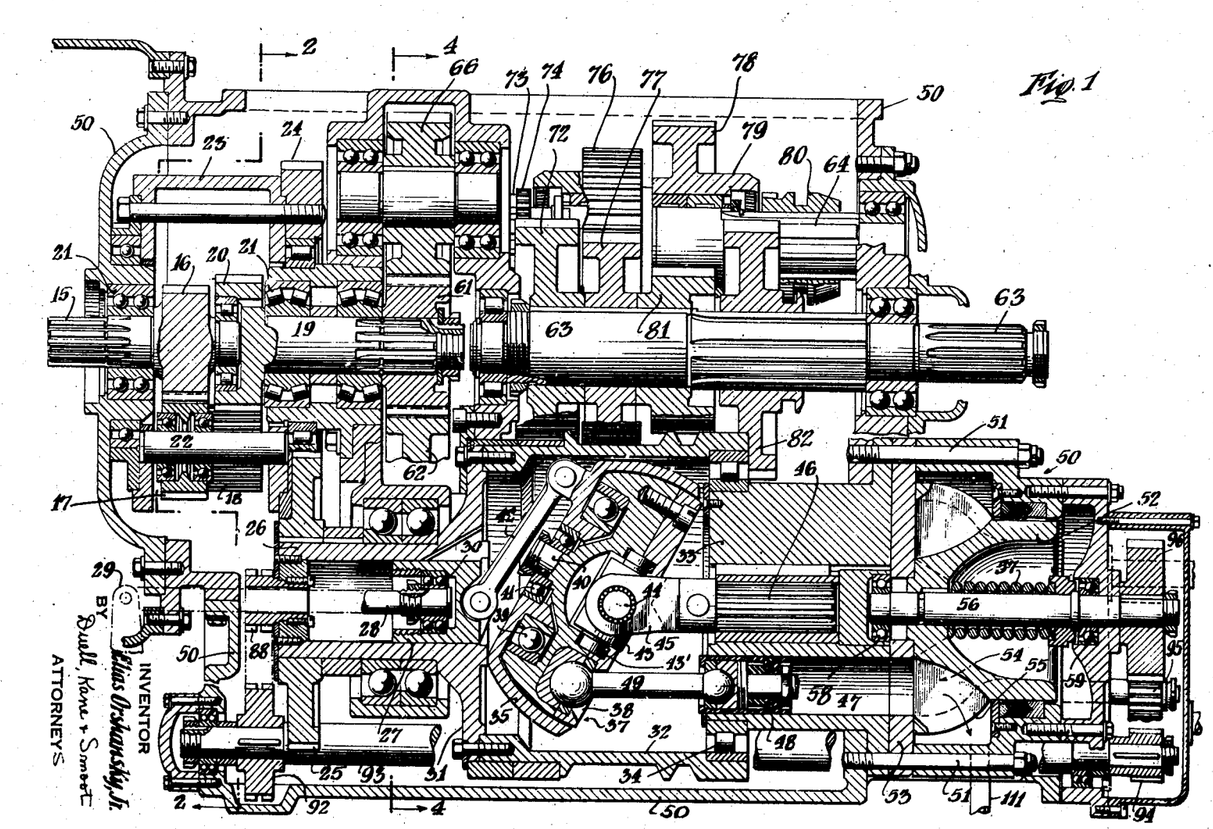
Fig. 1 is a sectional side view of a transmission and which, for the safe of convenience, has been taken in varying planes.

Referring primarily to Fig. 1, the numeral 15 indicates a driving shaft to be coupled directly to a motor of, for example, the internal combustion type. Secured to this shaft is a gear 16, the teeth of which mesh with gears 17, which, in turn, engage the teeth of gears 18. Axially aligned with respect to shaft 15 is a shaft 19, to which is secured a gear 20. The width of gears 18 is such that they simultaneously and constantly engage the teeth of both gears 17 and 20, and, as will be observed—referring especially to Fig. 2—three sets of gears 17 and 18 may be included.

Figure 2:
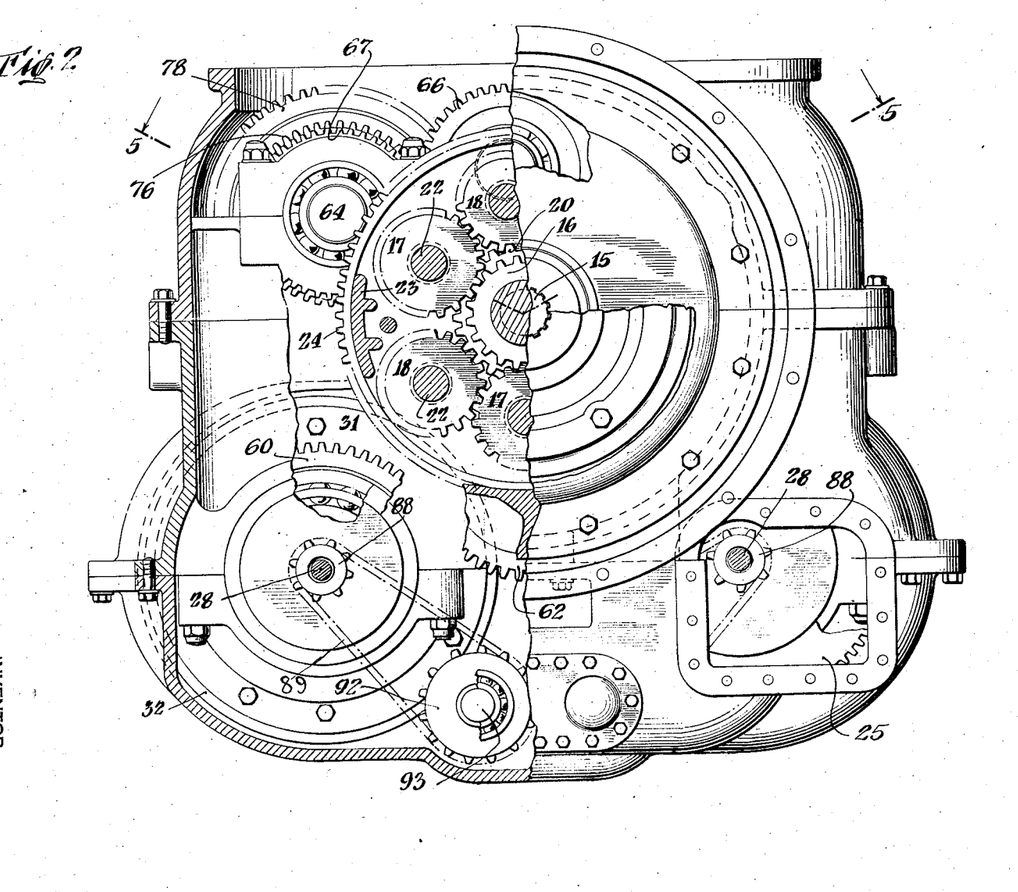
Fig. 2 is a partly sectional end view taken along the lines 2—2 and in the direction of the arrows of Fig. 1.

As will also be apparent, there is herein involved an assembly purely of the planetary type. Moreover, it will be apparent that, as described, gear 20 will always rotate in a direction reverse to the rotation of gear 16. It is also to be noted that gear 16, as illustrated, has twenty-one teeth, gear 20 has twenty-four teeth, and gears 17 and 18 each have eighteen teeth, although the number of the latter is relatively immaterial. It will be observed that shafts 15 and 19 are preferably supported by suitable anti-friction bearings 21, such bearings being, moreover, employed wherever possible in connection with the mounting of hereinafter described parts. Gears 17 and 18 are rotatably supported upon shafts 22, which latter are carried by a rotatably mounted cage 23.

Secured to the cage 23 in any desired manner is a gear 24 which meshes with a gear 25. The latter is keyed or otherwise fixed with respect to a rotatably mounted sleeve 26. This, as shown in Fig. 2, is arranged to one side of shafts 15—19. The sleeve 26 slidably supports a member 27 in the nature of a piston. Attached to this member is a rod 28 extending within the bore of sleeve 26 and beyond the same at which point it is coupled to an operating lever indicated at 29, and by means of which it may be reciprocated. Any suitable expedient whereby the sleeve and piston may freely rotate with respect to the rod 28 may be resorted to. For example, bearing 30 may be interposed between rod 28 and piston member 27 so that while the rod does not turn, the piston member may rotate with respect to such rod. Sleeve 26 may terminate in a disk 31 which may be suitably secured thereto or integral therewith. This disk in any event defines one end of a chamber, the side walls of which are defined by a drum 32. The inner or rear end of the chamber may be defined by a cylinder block 33 with respect to which drum 32 is freely rotatable as, for example, by bearings 34.

Figure 8:
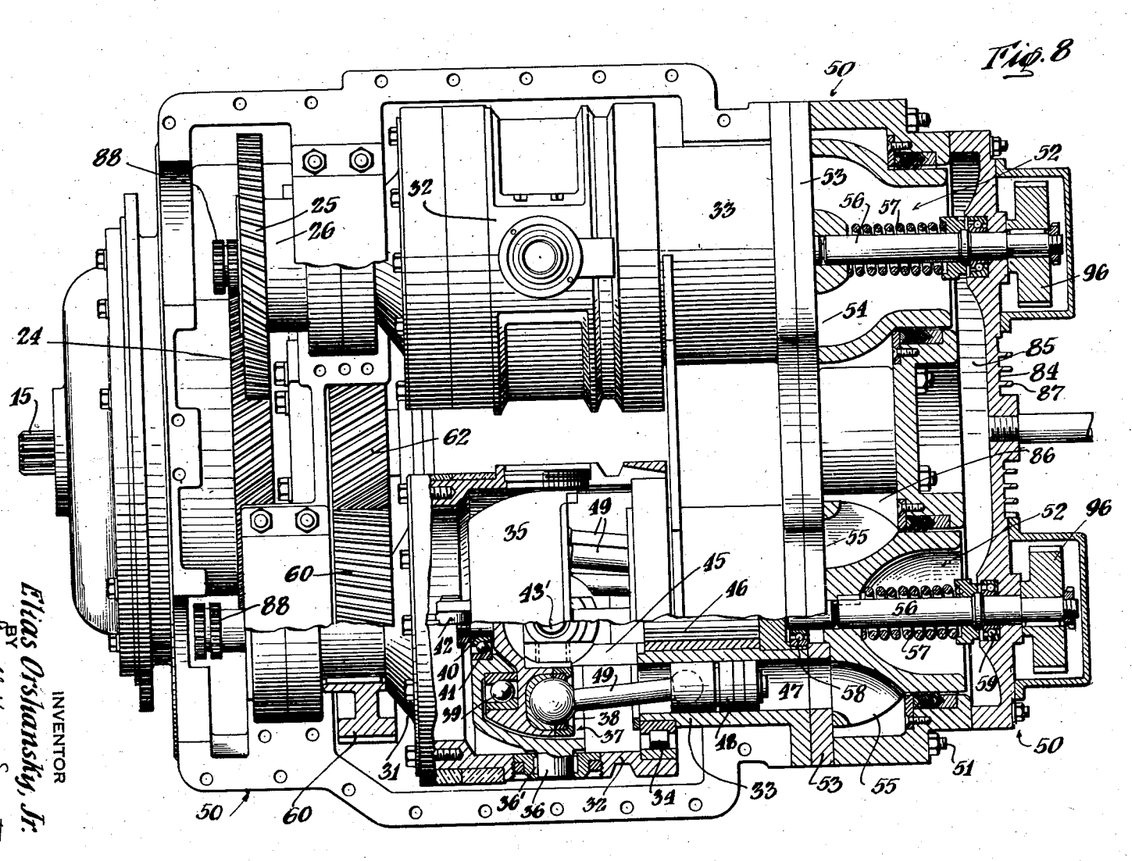
Fig. 8 is a bottom plan view with certain of the parts removed to disclose underlying constructions and with other parts shown in section along lines which, for the safe of convenience, extend through different planes.

Within the chamber thus provided there is disposed a cup-shaped member 35. As shown in Fig. 8, this member is rockingly supported by trunnions 36 extending within bearings 36' mounted in drum 32. Rotatably supported within cup 35 is a plate assembly 37 presenting a plurality of rod receiving recesses 38. The plate assembly is supported by a bearing 39 interposed between it and the base of cup 35. Moreover, this assembly is preferably formed with an extended portion 40 projecting through the base of cup 35 and normally secured against withdrawal, it being noted that again at this point a suitable anti-friction bearing 41 may be provided. A pitman or link 42 has its opposite ends rockingly secured to cup 35 and piston member 27, it being thus obvious that as rod 28 is reciprocated the entire wobble plate assembly will be oscillated around its trunnions 36. The plate assembly 37 may be centrally recessed to accommodate the body of a shaft 43' which rotatably supports a sleeve 43. In line with the center of the wobble plate and also in a plane common with the axis of trunnions 36, sleeve 43 is formed with trunnions 44. A fixed fork member 45 has its arms coupled by means of suitable bearings, one to each of the trunnions of sleeve 43. This member 45 is continued to extend into a recess formed in block 33. At this point splining 46 or any other suitable expedient is resorted to, to assure that member 44 is maintained against rotation with respect to block 33. As will hereinafter appear, the block is also maintained against rotation and it accordingly follows that the plate assembly 37, while free to oscillate with cup 35, is incapable of axial rotation.

Figure 3:
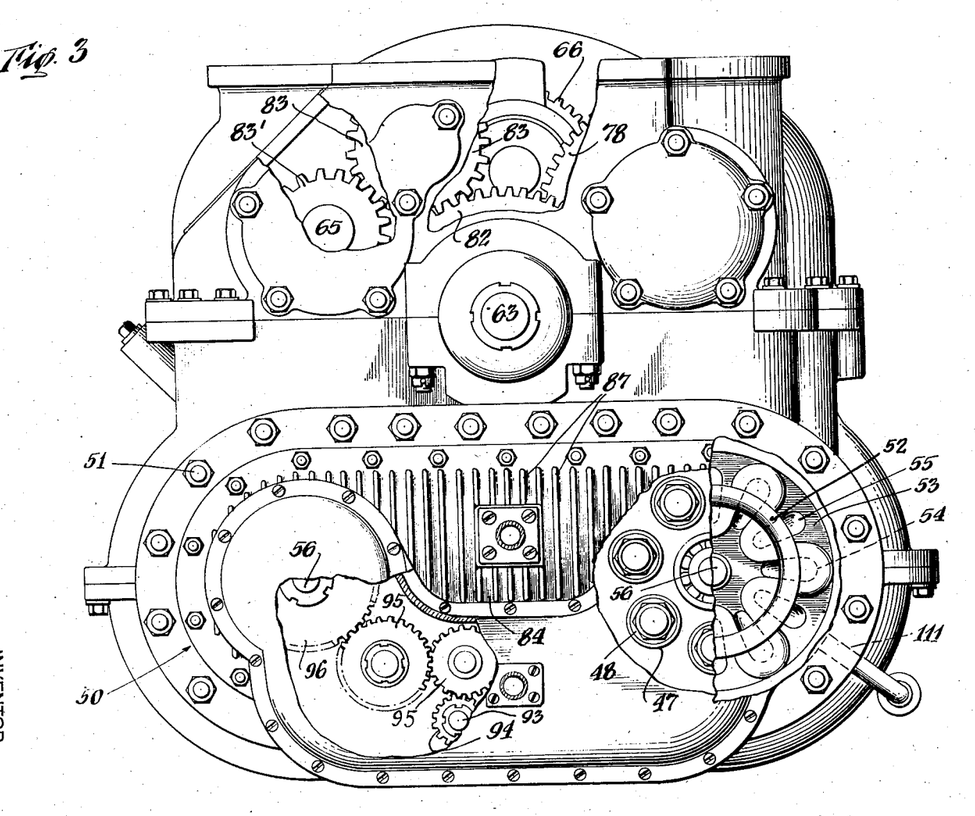
Fig. 3 is a view of the driven end of the transmission and with certain of the parts broken away to disclose underlying construction.
Figure 4:
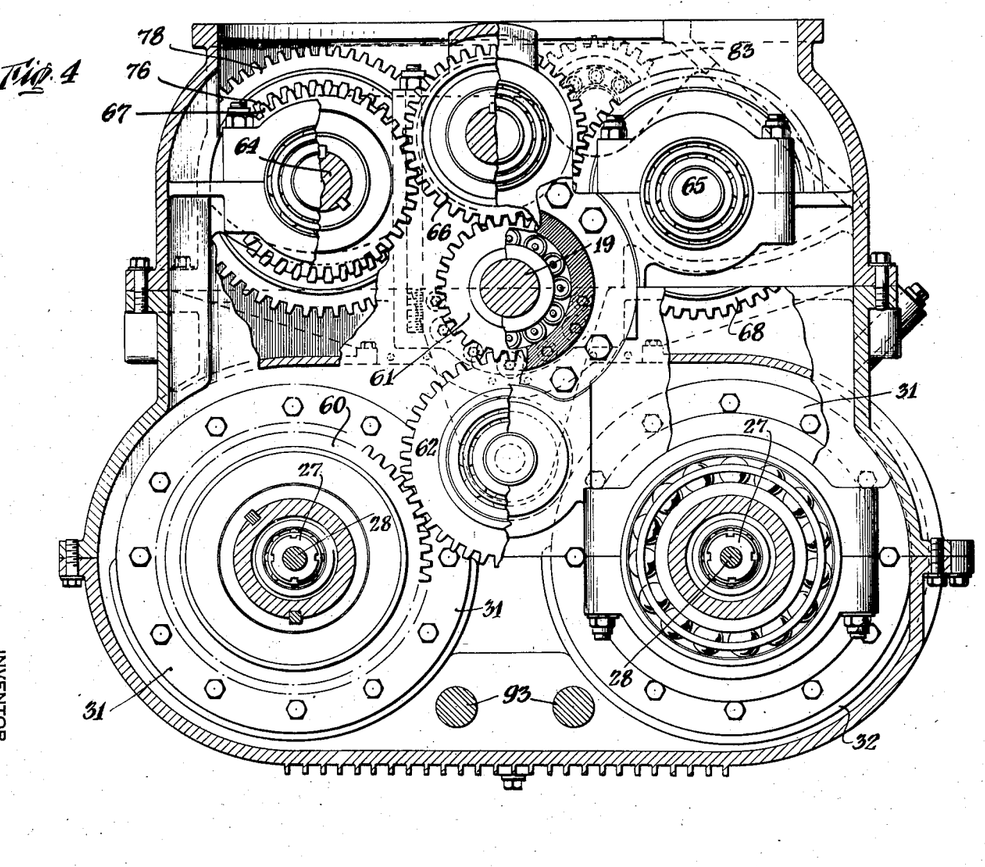
Fig. 4 is a transverse sectional view taken along the lines 4—4 and in the direction of the arrows of Fig. 1.

In the embodiment under consideration, the pump and hydraulic motor are substantially of identical construction. For this reason only the pump will be described in detail. As shown in Figs. 1 and 3, the cylinder block may be formed with 7 cylinders 47 within which pistons 48 reciprocate. Rods 49 have their ends respectively coupled to and bearing within the pistons and the sockets 38 of the plate assembly. From the foregoing it will be understood that as sleeve 26 is turned, it will rotate drum 32 and through trunnions 36 will similarly move cup 35. Due to the fact that pitman or link 42 maintains the cup at certain angles with respect to the axis of drum 32, it follows that normally as the cup rotates, it will cause plate assembly 37 to wobble, resulting in a reciprocation of rods 49 and the pistons attached thereto. Of course, under no circumstances does the plate assembly 37 rotate, although it is to be understood within the purview of the present invention it is contemplated, that which is of primary concern is to effect reciprocation of the pistons within the cylinder bores. In other words, if such a pump and motor assembly are utilized, it is preferred that the cylinder block be stationary, but this need not be the case, so long as relative rotation occurs between the cup (or its equivalent) and the block.

Figure 6:
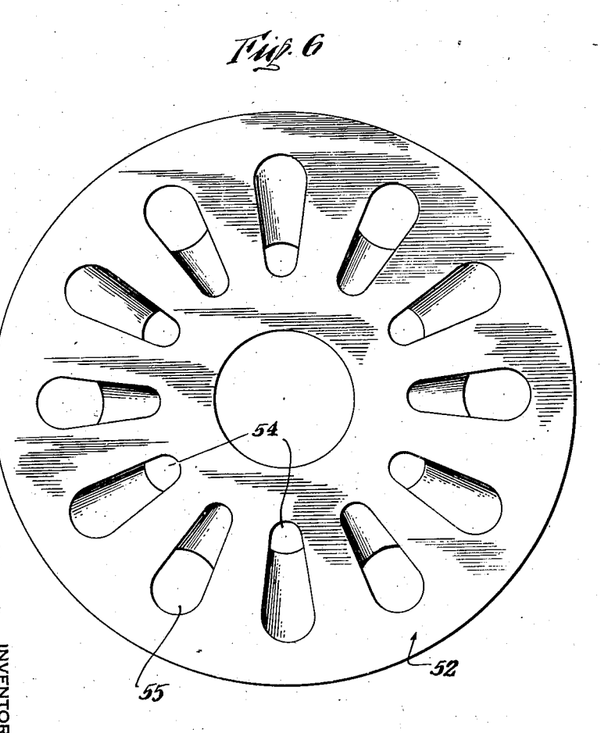
Fig. 6 is a face view of the valve member.
Figure 7:
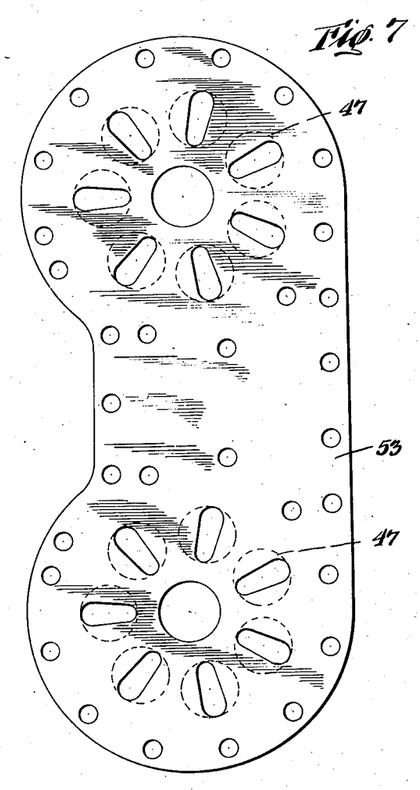
Fig. 7 is a similar view of the pump and motor bearing plate for the valve member.

The entire apparatus is enclosed within a casing or housing including any desirable number of sections 50, suitably coupled one to the other. It is to this housing that the cylinder block 33 is secured, as for example by means of bolts 51. Arranged beyond the rear ends of cylinders 47 is a valve member generally indicated at 52. A bearing plate 53 may be interposed between this member and the face of block 33. This plate is formed with openings in line with the bores of cylinders 47, as shown in Fig. 7, and these openings should correspond to the ends of the cylinders. The valve member 52, as shown in Fig. 6, is formed with pairs of adjacent ports which preferably have similar configurations, such pairs numbering one less than the number of cylinders provided. Also, preferably, the port widths should be equal, in each instance, to the surfaces intervening adjacent ports. Adjacent ports are respectively provided for the inflow and outflow of liquid and have been indicated by the numerals 54 and 55, respectively. Member 52 is secured to a rotatably supported shaft 56 and a spring 57 may be provided and bear against the valve member. It is to be observed that the inner bearing 58, supporting shaft 56, is of the usual type. Bearing 59, however, is preferably of the radial thrust type, and it will thus be understood that spring 57 normally acts to press member 52 into sealing contact with the plate 53.

In actual practice, it is to be observed that member 52 may bear against plate 53 with a contact pressure of approximately 300 pounds to the square inch and with a total pressure of approximately 8,500 pounds. This occurs incident to the fact that the fluid under pressure reacts against member 52, and this member is also acted upon by spring 57. The latter accounts for approximately 2,000 pounds of the total, the balance of contact pressure occurring incident to the reaction of the fluid which, under maximum working conditions, is at a pressure of approximately 700 pounds per square inch. In view of the fact that substantially only one-half of the area of the valve member is acted upon by the fluid (see Fig. 6), it will be understood that the pressure produced thereby is, under substantially maximum conditions, only 300 pounds per square inch of the over-all contact area between the valve member and bearing plate 53.

As afore brought out, the pump and motor are of similar construction, and as shown especially in Figs. 1, 4, 5 and 8, it will be observed that the motor is provided with a gear 60 which corresponds to gear 25 and the teeth of which mesh with the teeth of a gear 61 through an idler 62. Gear 61 is secured to shaft 19, and it will thus be obvious as gear 60 rotates, shaft 19 likewise rotates.

In view of the fact that in the present unit it is desired to have driving shaft 15 and driven shaft 63 rotate in similar directions, two counter-shafts are preferably employed. These shafts have been shown to best advantage in Fig. 5, whereby they are respectively indicated at 64 and 65. Gear 61 also has its teeth engaging the teeth of an idler gear 66, which in turn engages gear 67 secured to counter-shaft 64. This idler additionally serves to drive a gear 68 similarly secured to shaft 65. Slidably mounted upon the latter shaft is a clutching member 69, which, when shifted to the left as viewed in Fig. 5, engages with the correspondingly formed portion 70 of a gear 71. The teeth of the latter gear are constantly in mesh with the teeth of a gear 72, fixed against rotation with respect to shaft 63. In this manner, it is obvious that a drive may be effected from shaft 19 to shaft 63, and as shown, such drive will be in the ratio of substantially 3 to 1.

As afore brought out idler 66 also meshes with the teeth of gear 67 and thus serves constantly to turn this member and the shaft 64. Slidably mounted upon this shaft is a member 73, the clutching portion 74 of which may be engaged with a correspondingly formed portion 75 forming a part of gear 76, rotatably mounted upon shaft 64. The teeth of this gear are in mesh with the teeth of gear 77, the latter being secured against movement with respect to shaft 63. It follows that when member 73 is shifted to the right, as viewed in Fig. 5, it will couple gear 76 against movement with respect to shaft 64, thus driving gear 77 and shaft 63. If the drive provided by a clutching of member 69 with portions 70 is to be termed as "low speed," the drive afforded by coupling member 73 with gear 76 might be termed "second speed" in that a 1.6 to 1 reduction is effected by this drive upon the part of shaft 19 with respect to shaft 63.

Also mounted upon shaft 64 and rotatable with respect to the same is a gear 78 having a clutching portion or hub 79 with which clutch member 80 may cooperate. The latter is slidably mounted upon shaft 64 and when coupled with gear 78 serves to drive that gear at shaft speed. The teeth of this gear are constantly in mesh with gear 81 fixed against movement on shaft 63 and with gear 78 coupled to shaft 64 what might be termed a "third or high drive" results, and in which shaft 63 moves in the same direction with and at substantially the same speed as shaft 15. Under the circumstances the planetary cage remains stationary, or practically so.

Figure 5:
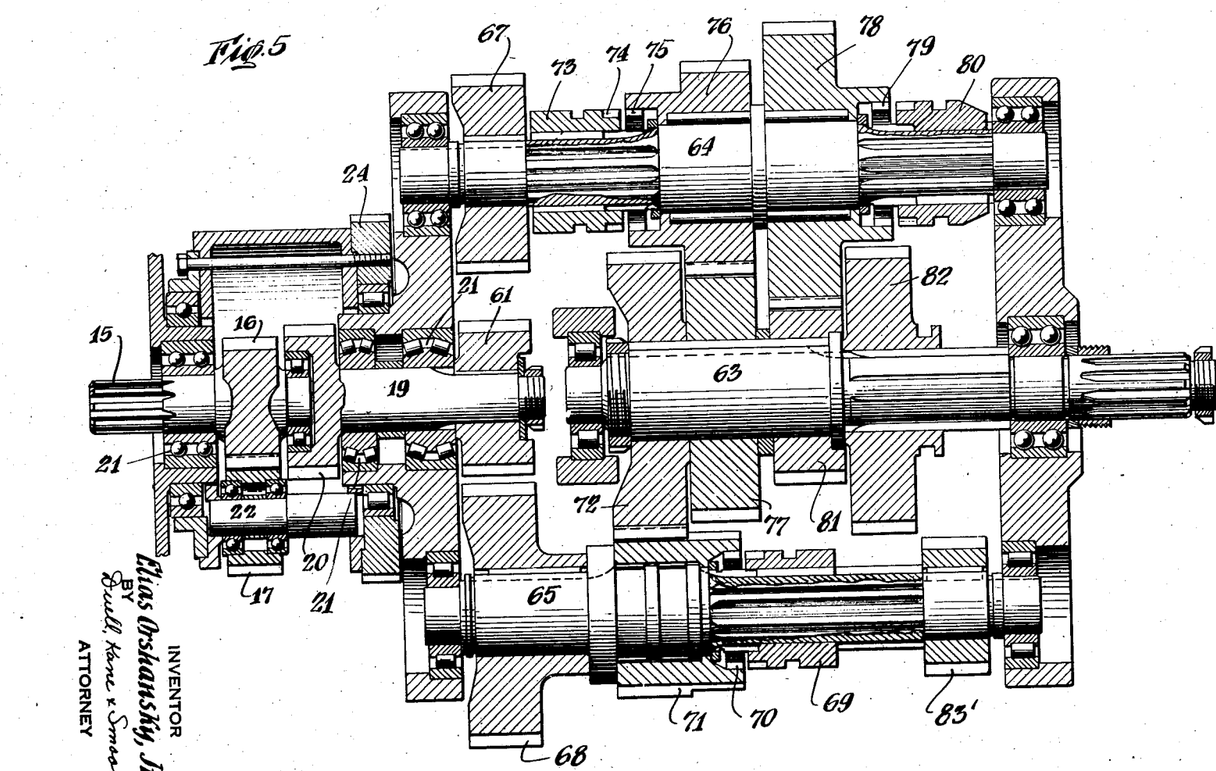
Fig. 5 is a partly sectional plan view taken along the lines 5—5 and in the direction of the arrows of Fig. 2.

Now with a view to providing for reverse rotation of the parts, it will be observed, referring to Fig. 3, that a gear 82 is slidably mounted upon shaft 63 and may be shifted to the right as viewed in Fig. 5, to have its teeth engage the teeth of an idler gear 83 which constantly meshes with a gear 83' secured to shaft 65. When so engaged, and with the planetary cage stationary, it is apparent that a drive ratio of approximately 4 to 1 of shaft 15 with respect to shaft 63 will occur, and that the drive to shaft 63 will be in a reverse direction than heretofore.

It is believed wise, at this time, instead of proceeding with a consideration of further structure, to review the action of the mechanism heretofore described. With this thought in mind, the apparatus will be set up in, for example, the manner illustrated in Figs. 1 to 8, inclusive, and the pump and motor mechanisms filled with oil or other suitable fluid. The casing 50 will also be filled with fluid of this type and act as a sump or reservoir for the excess of fluid which is required in the system. As illustrated, especially in Fig. 8, the end portion 84 of the casing, and which houses the valve members 52, is provided with a passage 85 accommodating the fluid which is flowing from the motor to the intake ports 54 of the valve member for the pump. Likewise, this housing provides a passage 86 which extends from the high pressure or discharge side of the pump to the intake ports of the valve member in association with the motor. It is also to be observed that the end face of the casing 84 may be provided with heat dissipating fins 87, should this be desired, and that the return passage may be coupled to a suitable reservoir or source of fluid supply.

Now, assuming that shaft 15 is rotated at any desired speed, the operator, by means of controls (hereinafter described) will engage member 69 with portion 70, thus providing for a "low speed" drive from shaft 19 to shaft 63. Moreover, by further controls (hereinafter also described) the wobble plates of the pump and motor will be shifted to proper angular positions. As illustrated, the angularity of both the motor and pump wobble plates may be varied. This is in most respects desirable, although it has been found that, so long as the angularity of motor plate may be varied, a satisfactory operation of the mechanism will follow. The adjustment of the pump wobble plate should be approximately 23° from a plane perpendicular to the axis of the cylinder block, and the inclination of the motor wobble plate may be from 0° to 30° from such position.

We will now assume that the load on shaft 63 is so great that no direct movement on the part of this shaft follows instantly, even though shaft 15 is turning. It will be obvious, under these circumstances, that gear 20 will likewise not turn, and this will cause orbital movement on the part of gears 17 and 18. Such orbital movement will cause the cage 23 to rotate, thus driving gear 24. This will result in a turning of the wobble plate of the pump in a manner heretofore described; again resulting in the pump discharging oil or similar fluid through ports 55 and drawing the same in through ports or passages 54.

The pressures built up will be relatively high, due to the comparatively small inclination of the wobble plate of the pump and for the reason that the motor is at the initial instant stationary. As afore pointed out, the valve members 52 have pairs of ports which are one less in number than the numbers of cylinders which they are to serve. If properly driven, these valve members will produce a vernier action whereby, with a 60° movement on the part of the valve member, an inlet and outlet port will have been successively presented to one cylinder. During this same interval the wobble plate—together with the structure associated therewith—will have moved through 360° and this movement will have been in a direction reverse to the movement of the valve.

Before further considering the co-action of the parts, it is believed best to refer to the drive whereby these relative movements of the wobble plate and valve member will occur. To this end attention is directed primarily to Figs. 1, 2, 3 and 8, in which it will be observed that the portions 26 of both the pump and motor mount sprockets 88 over which chains 89 pass, the latter passing over sprockets 92 affixed to shafts 93. These shafts extend lengthwise of the unit and as illustrated mount at their rear ends gears 94 which, through idlers 95 and gears 96 drive shafts 56, rotatably mounted in casing section 84 to which the valve members 52 are attached. Incidentally, it is to be observed that the springs of both the pump and motor units may be of any desired character and that if desired solely these springs or their equivalents may be relied upon to provide for proper contact pressure between the valve mechanism and the cylinder—or cylinder plate faces. In other words, the differential of pressure as existing in the hydraulic passages need not be depended upon to supplement the action of springs 57.

Figure 9:
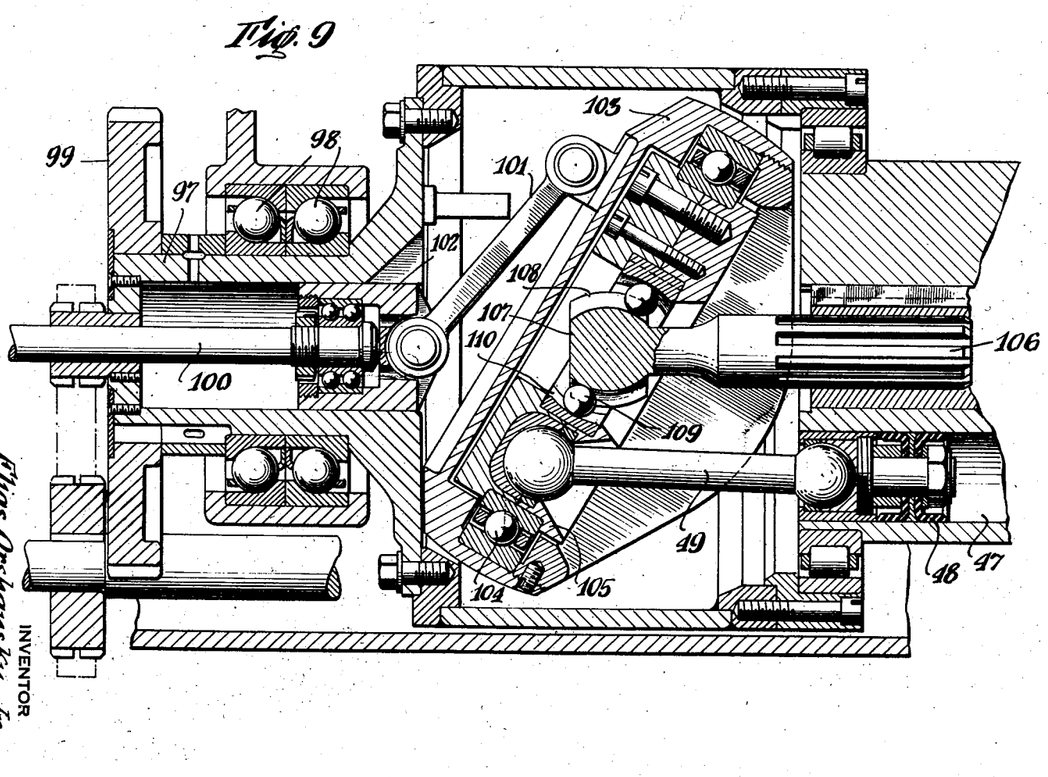
Fig. 9 is a fragmentary enlarged sectional view, showing an alternative and, in some respects, preferred form of wobble plate and universal connection.

Attention is next directed to Fig. 9 in which a somewhat simplified form of construction has been provided. In this view the numeral 97 indicates a sleeve corresponding to sleeve 26 and which is anti-frictionally mounted by bearings 98. A gear 99 corresponding to gear 25 is furnished and within the sleeve a rod 100 moves in a manner similar to that heretofore described in connection with rod 28. A link 101 has its inner end coupled to member 102, its outer end being coupled to a cup-shaped member 103. Rotatably supported within this cup-shaped member by means of suitable bearings 104 is a disk 105. It will be understood that this disk actually includes, as shown, any suitable number of portions secured against movement with respect to each other by bolts or otherwise, and providing recesses to receive the outer ends of piston rods 49.

A "constant velocity" universal is furnished by securing a rod 106 against movement with respect to the cylinder block and having the head portion 107 of this rod extending into the central bore of the disk or plate assembly 105. Also, the head 107 presents an annular series of grooves 108 within which suitable bearing elements 109 ride. The latter also extend into grooves 110, complementary to grooves 108 and formed in the disk or plate assembly 105.

As a consequence of this structure it is apparent that it is feasible to dispense with bearings 39, 41 and 44, as well as the sleeve member 43 and fork member 45. In lieu thereof merely bearings 104 and 109 are furnished. The latter bearings provide, not alone for a "constant velocity" universal, but also, while allowing proper oscillation of the plate assembly with respect to the cylinder block, prevent all other movements thereof. Thus the structure is materially simplified and should be employed wherever it is not essential to resort to the structure as heretofore traversed in Fig. 1, et seq.

Figures 12, 13, 14:
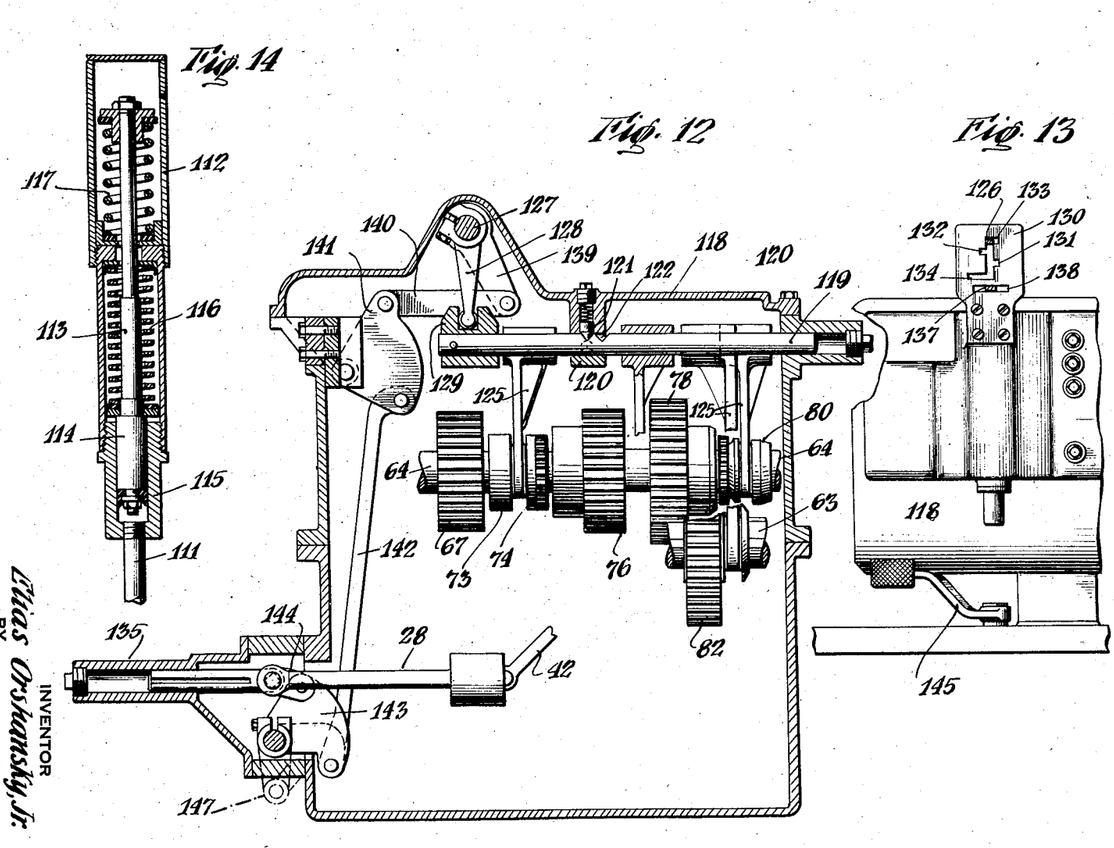
Fig. 12 is a sectional side view of the control mechanism.
Fig. 13 is a fragmentary sectional plan view taken along the lines 13—13 and in the direction of the arrows of Fig. 10.
Fig. 14 is a longitudinal sectional view of a cushioning mechanism which may form a part of the unit.

As indicated at 111 in Figs. 1 and 3, the high pressure passages connecting the pump and motor may be tapped. In this manner it is feasible to connect to these passages surge preventers, or cushioning elements, such that "hammering" will not occur. A convenient form of mechanism which may be utilized in this connection is illustrated in Fig. 14 in which the numeral 112 indicates a multi-section casing through which a rod 113 extends. The inner end of this rod terminates in a piston portion 114 riding within a cylinder 115, secured to the inner end of casing 112. Springs 116 and 117 are coupled to rod 113, and cause the latter to normally maintain it in a floating condition and with the piston projected. However, in the event that pressure surges occur, piston 114 will be projected against the action of spring 116, thus relieving the pressure condition. As soon as normal pressures are reestablished, the piston will return to the position shown in Fig. 14.

Now with a view to providing suitable controls for the apparatus, it will be observed, as in Figs. 10 to 13 inclusive, that the gear and clutch assemblies, as especially illustrated in Fig. 5, may be located adjacent a deck portion 118 of the apparatus and which deck portion may form a part of the encasing structure. Below the same a plurality of shifting rods 119 are slidably supported within guides 120. One of the guides for each of the rods may mount a spring pressed pin 121. This pin may be tapered and engage within pairs of notches 122 formed in each of the rods. As a consequence, each of these rods is normally maintained in one of two pre-determined positions and a deliberate shifting of the parts is necessary to effect a displacement of any rod from any one to the other position. Moreover, as especially shown in Fig. 11, each of the rods may be drilled as may also one one of the guiding or supporting portions 120. Within the bores thus provided pins and detents 123 and 124 are mounted. Thus, in accordance with accepted practice, if one of the rods is displaced from its normal position, none of the remaining rods may be shifted until the initial rod has been returned to such position.

Shifting forks 125 may be coupled to each of these rods and extend to the "low," "intermediate," "third or high," and "reverse" stations of the gear trains, clutches, etc., as heretofore described in connection with Fig. 5. Deliberate shifting of the rods is secured conveniently by a lever 126 coupled to a shaft 127, which mounts shifting elements 128 selectively engageable with shifting blocks 129 secured one to each of rods 119. As especially shown in Fig. 13, a plate 130 may be secured to plate 118 and provide a slot having branches 131, 132, 133, and 134. These branches respectively correspond to and define the positions which lever 126 should assume to assure an engagement of the three forward and one reverse speed, as provided for by the gear trains or their equivalents. As before described, the position of the pump and motor wobble plates is established by rods 28 and 100, as respectively shown in Figs. 1 and 9. Referring again to Figs. 10, 12 and 13, it will be observed that, as viewed in the first of these figures, the right hand rod 28 is the one which governs the inclination of the pump wobble plate.

Figures 10, 11:
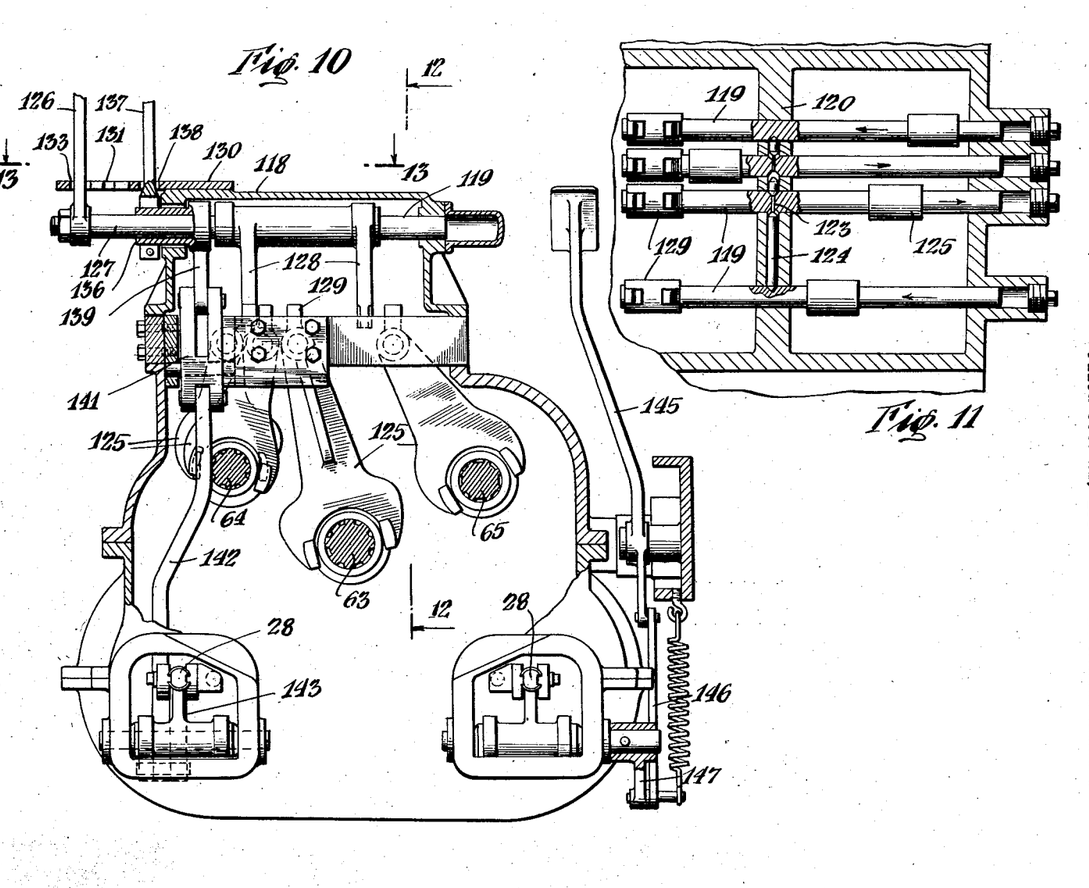
Fig. 10 is a transverse sectional view showing the controls for the unit.
Fig. 11 is a fragmentary plan view of such controls.

Both rods may have their forward ends guided as at 135 to assure a direct reciprocation thereof. Encircling shaft 127 is a sleeve 136, capable of being oscillated around shaft 127 by lever 137. This lever may also extend through a slot 138 in plate 130 and a locking dog or pawl and ratchet mechanism (not shown) may be employed to maintain the lever in any position to which it has been adjusted. Sleeve 136 has an arm 139 extending from it. The latter is link-connected as at 140 to a quadrant 141 rockingly mounted within the housing. A link 142 is connected to a further quadrant 143 which is in turn link-connected as at 144 to rod 28 or its equivalent. It follows that when lever 137 is oscillated the linkage in quadrants 140 to 144 will be shifted to reciprocate rod 28 and to accordingly vary the angularity of the motor wobble plate.

Suitably mounted adjacent or on the housing is a control 145 which may take the form of a foot pedal and arm, link connected as at 146 to a quadrant member 147 which latter is coupled to rod 28 of the pump to assure a reciprocation of the latter. It is obvious that such reciprocation of this rod and varying angularity of the pump wobble plate will occur as the pedal 145 is oscillated.

In operation it will be understood that shaft 15 is coupled to a prime mover (such as an internal combustion motor) and shaft 63 is coupled to a member or members to be driven. The latter may conveniently take the form of an axle assembly, or as otherwise desired. It will also be understood that with a prime mover of the type heretofore referred to, a variation in speed of the driving shaft may usually occur. This being realized, it is preferred, in the interest of simplicity, to consider the driving shaft as moving, for example, at a constant rate of speed.

Under these circumstances the planetary assembly indicated at 16, 17, 18 and 20 will move and cause a rotation on the part of driven shaft 19. However, assuming the gear train not to be coupled, no drive will be effected to driven shaft 63. Now, if pedal 145, or an equivalent control, is actuated, the wobble plate of the pump will be brought to a position substantially perpendicular to the axis of its shaft. Likewise, by actuating lever 137, the motor wobble plate will be brought to a position of maximum inclination. The operator will now engage, through lever 126 or an equivalent control, the "low" drive of the gear assembly as viewed in Fig. 5. Of course, if some form of drive other than gear trains and dog clutch assemblies is employed in parallel with the pump and motor, then that drive will be correspondingly potentialized. In any event, with the pump wobble plate in what might be termed "neutral position" no power transmission to shaft 63 will occur. It must be borne in mind that under these circumstances member 26 is being turned by gear 25, the latter being driven by gear 24. Now, as the angularity of the pump wobble plate is increased, it follows that the pump will be energized to drive the motor and thus drive shaft 63. Of course, in such driving the "low" gear train assumes its proportion of the load. With shaft 63 turning, the operator shifts lever 137 so as to decrease the angularity of the motor wobble plate. Accordingly, the speed of rotation of the motor shaft will increase and thus a condition will be established which will represent maximum speed on the part of the driven shaft 63 while in the low series range of the transmission.

Thereupon the operator will again actuate pedal 145 or its equivalent, shift lever 137 to its initial position, shift lever 126 to establish the intermediate range of the series, and release or actuate the control 145. It will now be found that the transmission causes a driving of shaft 63 at a speed which, in the illustrated embodiment, might be termed "low intermediate." Again, a shifting of lever 137 will cause gradual acceleration of the R. M. P. of shaft 63 until a maximum condition has again been established, whereby by again repeating the afore described operations and shifting lever 126 to occupy branch 133, a "low direct drive" is established which may be speeded up to a point where, for example, shafts 15 and 63 are rotating in unison.

Exactly the same form of control is resorted to where a reverse drive is desired. Usually, in such a drive, relatively small speeds are desired. However, acceleration may again be achieved by simply shifting lever 137 while the proper gear train is engaged. Of course, under all conditions of drive, as afore referred to, the proportions of drive occurring hydraulically as against that occurring through the mechanism which furnishes the series of drive ranges will be governed by factors of which the following are the most important: one, the capacity of the pump: two, the capacity of the motor; three, the resistance to turning offered by the driven unit, and/or, four, the condition of acceleration or deceleration which the drive shaft is undergoing, incident to the operator varying the speed of the latter. It is, of course, obvious that under ordinary circumstances the speed of movement of the pump and motor shafts will not synchronize, even if these units be of identical capacity. To provide for such synchronization, both wobble plates would have to be inclined to an identical extent, the load on the driven shaft would have to be constant, and the drive exerted by the driving shaft would likewise have to be a non-variable factor. Regardless of causation it, will, of course, be understood that the pump drive through the planetary gearing assembly or its equivalent furnishes a reaction force or point assuring a greater or lesser degree of drive through the "change speed" gearing, or functionally equivalent mechanism employed to provide the series of drive ranges. Of course, the foregoing factors are always relative. In other words, if the resistance to movement on the part of the driven member is sufficiently great, a condition may be presented under which drive through the low range mechanism may substantially not occur, and the pump may only turn slowly. However, under these circumstances a maximum driving force would be imparted to the driven shaft through the hydraulic side of the transmission. Under all circumstances the valve mechanisms of the pump and motor will accurately control the operation of these units and no undue friction will be presented incident to the vernier action which occurs.

From the foregoing, it will be appreciated that a transmission is furnished which, as in the illustrated embodiment, provides for a series of ranges determined by gear and clutch assemblies, and by what might be termed the hydraulic side of the transmission. Of course—and as afore brought out—in lieu of the gear train and clutches, numerous other expedients might be resorted to, although it is preferred that mechanical drives be employed. It is thus feasible to utilize a transmission constructed in accordance with the teachings of the present invention to effect the driving of shafts or other elements which have heretofore been susceptible to being driven only by extremely involved and expensive types of apparatus and which, aside from problems of bulk, weight, expense, and complication, have not produced results as efficient as those achievable by the present invention.

Figure 15:
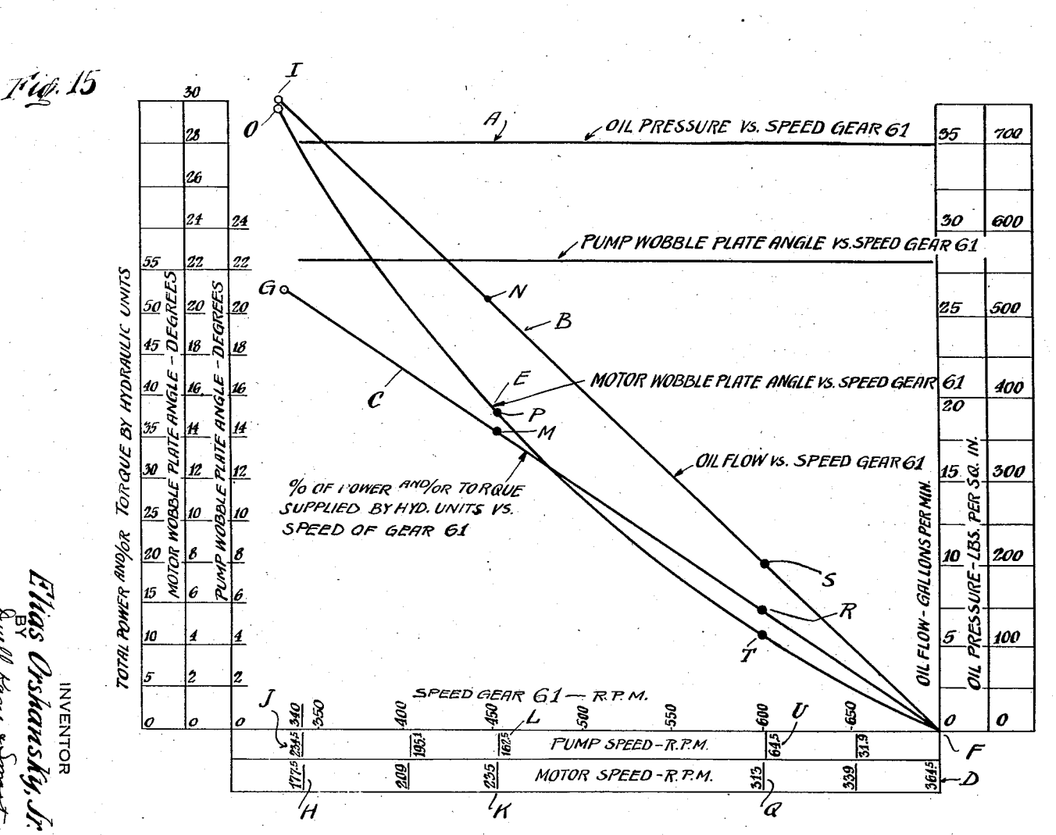
Fig. 15 is a representation of a chart showing the various operating characteristics of the unit.

Now, with regard to Fig. 15, it is primarily to be understood that this diagram represents the conditions existing within the transmission and during one stage of operation. In other words, it has been heretofore noted that in the illustrated embodiment three ranges of forward drive are furnished by the different gear trains, clutches, etc., which are provided. It has also been noted that a greater or lesser number of drive ranges might be furnished. Thus, the conditions represented in the diagram are duplicated throughout each range of drive of which the unit may be capable.

With this thought in mind, Fig. 15 discloses the relationship between engine torque, torque of gear 61, pump torque, and the torque of the motor as well as the speeds of these various factors. It is also to be remembered that the planetary gear is of such construction as to cause shaft 19 to rotate in a direction opposite to shaft 15, in order to maintain the speed of cage 23 at a reasonable maximum, as the speed of shaft 19 approaches zero. This is extremely desirable if not essential, as in certain types of gears the speed of the controlling member may become too high with a reduction of the speed of the output member.

With the foregoing in mind, it will be remembered that the pump is directly geared to the cage and that the rotation of the pump affects the speed of gear 61 by changing speed of the cage. Also, that the drive transmitted from shaft 15 to shaft 19 has for its reaction factor the resistance offered by the oil pressure within cylinders 47 of the pump, and that, therefore, in addition to being geared to the cage which of course makes the speed of the cage and pump interdependent, the pump also generates varying oil pressure dependent on the load on shaft 19.

Let us assume for the purpose of simplicity that the engine is operating at maximum output and that the speed of gear 61 is controlled in such a manner as to always drive gear 66 with the greatest amount of torque at any given speed. Due to the reaction of the cage on the pump and the constant conditions mentioned, there will be a constant oil pressure generated by the pump as indicated by straight line A. In varying the speed of gear 61 the pump will rotate at various speeds and will therefore pump various amounts of oil, as indicated by the line B. This amount of oil will be available to drive the motor. It has been assumed that the pump wobble plate has a constant inclination during driving. The motor therefore receives oil at a pressure indicated by line A and at a volume indicated by line B. However, it is necessary for the motor to supply such a torque that the torque acting on gear 66 will be inversely proportional to its speed. Such a torque is represented by line C.

In order to produce a torque as called for by line C with the oil at a constant pressure as at line A, it is essential to control the capacity of the motor as shown by curve E. We see, therefore, that starting from a condition at F, where the speed of the pump is zero, speed of the motor is 364.5 R. P. M., oil pressure within the pump 700 lbs., oil out-put zero; and going to the left in the direction of a decreased speed of the motor and an increased speed of the pump, more and more volume of oil at a constant pressure of 700 lbs. will be handled by the hydraulic units and therefore a constantly increasing percentage of "driving force" will be transmitted by the hydraulic unit.

In order to decrease the size of the hydraulic units and not to transmit more than between 50 to 55% of engine torque and power by such units, it has been necessary to add two additional ratios of drive.

It is apparent that the amount of power transmitted hydraulically increases with reduction of speed of shaft 19, assuming 15 to run at a constant speed. Therefore, there occurs a division of power through the planetary generally described at 23, in such a manner that power is at all times transmitted from gear 16 to gears 17, 18 and 20, and consequently shaft 19, while at the same time power is likewise transmitted from gear 16 to gears 17, shafts 22 and cage 23 and thence to gear 24 to the pump from which the power is transmitted by oil pressure to the motor. Here, through gear 62 it is added to gear 61 which, however, at all times carries the torque transmitted through the gear of the planetary system. It is to be noted that the reaction for the drive of the planetary gears falls on the pump and consists of the reaction of the equivalent of one torque of the prime mover, whereas the reaction for torque in excess of that equivalent of one torque falls on the motor and is transmitted to gear 66 through gearing indicated at 62, 61 and 66. Accordingly the transmission consists of two systems—a planetary for transmitting torque and controlling the speed of the output shaft and the point of reaction for such planetary which is the pump and which at the same time produces hydraulic power which drives the motor and adds the increased torque of the motor to the output shaft, using the motor structure as a reaction member.

The purpose of the transmission is to place upon the motor any torque in excess of what the engine can handle through the planetary gearing and use the reaction of the planetary cage to supply the power to the motor. In this way, however, whatever the output torque requirement, the prime mover will never be loaded beyond its designed maximum, irrespective of ratio of torque and speed employed in the transmission. Likewise an additional purpose of the transmission is to allow the hydraulic system to carry as little power as possible by supplying it with additional gearing, or its equivalent, so as to cause it to operate in a series of recurring cycles through the various mechanical gears.

Let us suppose that the transmission is starting in any given gear from standstill and that therefore the output load is the highest. This will mean that the hydraulic motor will in this case supply 53% of the torque in addition to the engine torque supplied by the planetary, and this condition is indicated at point G. Motor speed will, at this point be 177½ R. P. M. (point H). The amount of oil pumped will be 37 gals. per minute, as shown at point I, and the pressure of oil will be 700 lbs. as shown on line A. The pump speed at that point will be 234.5 revolutions as at point J.

Now supposing as operating conditions occur, the torque requirement on the output end will fall and the speed of the output shaft will rise in such a way that the motor speed will correspondingly rise to 235 R. P. M., (point K). The pump speed will drop to 162.5 R. P. M., (point L). The torque supplied by the hydraulic motor will drop to 35% of torque supplied by the planetary as at point M, and the oil flow will drop to 27 gals. per minute as at point N.

Of course, it will be seen that gradually the motor wobble plate has been reduced from 30° at point 0, to approximately 15° at point P. Throughout whatever changes occur in the hydraulic system during the transmission of power, the pump wobble plate in this case remains at a constant setting.

Supposing the torque requirement on the output shaft 63 drops still further so as to allow the shaft to speed up, which will raise the motor speed to 313 R. P. M. as at point Q. At that point the pressure will still remain 700 lbs. since it is constant, the percentage of engine torque added by the motor will become about 13% as at point R. The oil flow will become about 10 gals. per minute as at point S, and the angle of the motor wobble plate will become approximately 5° as at point T. The pump speed will be reduced to 64.5 R. P. M. as at point U. If the torque requirement continues to drop, the motor speed will reach 364.5 R. P. M. as at "D" and the pump speed will reach zero as at F. The inclination of the motor wobble plate will also reach zero, but the pump motor plate will still remain at a constant angle and the oil pressure will still remain at 700 lbs. since it will act as a reaction for the planetary drive. In addition, let us suppose that the entire procedure outlined above has taken place and while the transmission was in low gear, and that the torque requirement continues to drop even more than indicated at point F, then we shift into second and can again go through the procedure beginning at point G, and going through point U, as outlined above; and beyond this point we can shift even higher into "direct" drive and for a third time go through the entire procedure outlined above. In this way, in going from a maximum torque at a minimum speed of shaft 63 up to a substantially direct drive with the torque at all times being inversely proportional to the speed of shaft 63, we have shifted gears twice from low to second and from second to high, and in each gear have traversed the procedure as described with reference to Fig. 15. In short, in each gear the hydraulic unit has come in to fill the gap between the ratio available at one gear and the ratio available at another gear, and to give a smooth torque to speed relation between the gear changes. In each such shifting it is of course obvious that the wobble plate of the pump is neutralized incident to the pedal or other control utilized for this purpose.

Thus, among others, the several objects of the invention as afore noted, are achieved. It is obvious that numerous changes in construction and rearrangement of the parts might be resorted to without departing from the spirit of the invention as defined by the claims.

Having described my invention, what I claim as new and desire to secure by Letters Patent is:

1. A variable speed transmission comprising in combination a driving shaft, a driven shaft, a differential mechanism forming a torque applying driving connection between said shafts and including four interconnected elements two of which are displaceable relative to the others, the remaining two elements being coupled respectively to said shafts, a pump operatively connected to said displaceable elements, a variable capacity motor operatively connected to said driven shaft, and means providing a passage from said pump to said motor, said pump and motor each including a movable part and a stationary part whereby the reaction of the movable parts of the pump and motor upon the stationary parts thereof enable said motor to apply driving torque to said driven shaft and in addition to the driving torque applied to said shaft through the differential mechanism.

2. A variable speed transmission comprising in combination a driving shaft, a driven shaft, a planetary assembly forming a torque applying driving connection between said shafts and including four intermeshing gear elements, one pair of which are displaceable relative to the other two, the latter elements being coupled respectively to said shafts, one of said pair of elements having its teeth engaging solely the teeth of the element coupled to said driving shaft, the other of said pair having its teeth solely engaging the teeth of said one element and the element coupled to said driven shaft, a pump operatively connected to said pair of displaceable elements, a variable capacity motor operatively connected to said driven shaft and means providing a passage from said pump to said motor, said pump and motor each including a movable part and a stationary part whereby the reaction of the movable parts of the pump and motor upon the stationary parts thereof enable said motor to apply driving torque to said driven shaft in addition to the driving torque applied to said shaft through the planetary assembly.

3. A variable speed transmission comprising in combination a driving shaft, a driven shaft, a planetary assembly forming a torque applying driving connection between the shafts and including a gear element coupled to said driving shaft, a gear element coupled to said driven shaft, a cage rotatably mounted with respect to said shafts, a pair of gears rotatably supported by said cage, one of said latter gears having its teeth engaging one of the gear elements coupled to one of said shafts, the other of said gears having its teeth engaging solely the first named gear and the gear element coupled to the other of said shafts, a pump operatively connected to said cage and operated upon the displacement of said gear pair, a variable capacity motor operatively connected with said driven shaft and means providing a passage from said pump to said motor, said pump and motor each including a movable part and a stationary part whereby the reaction of the movable parts of the pump and motor upon the stationary parts thereof enable said motor to apply driving torque to said driving shaft in addition to the driving torque applied to said shaft through the planetary assembly.

4. A variable speed transmission comprising a driving shaft, a driven shaft, a differential mechanism forming a torque applying driving connection between said shafts and including three elements, one of which is displaceable relative to the others, two of said elements being coupled respectively to said shafts, a pump operatively connected to the other of said elements and operated upon the displacement of the displaceable element, a variable capacity motor operatively connected with said driven shaft, means providing a passage from said pump to said motor, said pump and motor each including a movable part and a stationary part whereby the reaction of the movable parts of the pump and motor upon the stationary parts thereof enables said motor to apply driving torque to said driven shaft in addition to the driving torque applied to said shaft through the differential mechanism, and means forming a part of said differential mechanism whereby said driving and driven shafts are caused to rotate in reverse directions.

5. A variable speed transmission comprising a driving shaft, a driven shaft, a differential mechanism forming a torque applying driving connection between said shafts and including three elements, one of which is displaceable relative to the others, two of said elements being coupled respectively to said shafts, a pump operatively connected to the other of said elements and operated upon the displacement of the displaceable element, a variable capacity motor operatively connected with said driven shaft, means providing a passage from said pump to said motor, said pump and motor each including a movable part and a stationary part whereby the reaction of the movable parts of the pump and motor upon the stationary parts thereof enables said motor to apply driving torque to said driven shaft in addition to the driving torque applied to said shaft through the differential mechanism, a second driven shaft, said motor being operatively connected to said second shaft and whereby the driving torque applied by the latter in addition to the driving torque applied through the differential mechanism is transmitted to said driven shaft.

ELIAS ORSHANSKY, JR.